（12） United States Patent
Hashimoto et al.

(10) Patent No.: US 10,435,013 B2
(45) Date of Patent: Oct. 8, 2019

(54) HYBRID VEHICLE DRIVE SYSTEM

(71) Applicants: Hiroto Hashimoto, Susono (JP); Yuji Iwase, Mishima (JP); Hiroaki Ebuchi, Hadano (JP); Hidekazu Nagai, Susono (JP); Shotaro Kato, Susono (JP)

(72) Inventors: Hiroto Hashimoto, Susono (JP); Yuji Iwase, Mishima (JP); Hiroaki Ebuchi, Hadano (JP); Hidekazu Nagai, Susono (JP); Shotaro Kato, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 271 days.

(21) Appl. No.: 14/784,474

(22) PCT Filed: Apr. 16, 2013

(86) PCT No.: PCT/JP2013/061331
§ 371 (c)(1),
(2) Date: Oct. 14, 2015

(87) PCT Pub. No.: WO2014/170967
PCT Pub. Date: Oct. 23, 2014

(65) Prior Publication Data
US 2016/0068155 A1    Mar. 10, 2016

(51) Int. Cl.
*B60W 20/00* (2016.01)
*B60W 20/40* (2016.01)
(Continued)

(52) U.S. Cl.
CPC ........... *B60W 20/40* (2013.01); *B60K 6/445* (2013.01); *B60W 10/02* (2013.01); *B60W 10/08* (2013.01);
(Continued)

(58) Field of Classification Search
CPC ............................ B60W 10/08; B60W 20/40
(Continued)

(56) References Cited

U.S. PATENT DOCUMENTS 5,508,916 A    4/1996  Markyvech et al.
5,846,155 A *  12/1998 Taniguchi ............... B60K 6/48
                                                   477/2
(Continued)

FOREIGN PATENT DOCUMENTS

JP    08-261250 A    10/1996
JP    2003-161367 A    6/2003
(Continued)

OTHER PUBLICATIONS

International Search Report dated Jun. 11, 2013 for PCT/JP2013/061331 filed on Apr. 16, 2013.

*Primary Examiner* — Jacob S Scott
*Assistant Examiner* — Michael E Butler
(74) *Attorney, Agent, or Firm* — Oblon, McClelland, Maier & Neustadt, L.L.P.

(57) ABSTRACT

A hybrid vehicle drive system includes: an engine; a rotary machine; a gear type engagement device; and a controller configured to: control a vehicle to travel in a first mode in which a reaction force of the engine is received by a torque of the rotary machine, and in a second mode in which the reaction force of the engine is received by the engagement device. The controller is configured to perform a first control of receiving the reaction force of the engine by the torque of the rotary machine, increasing a magnitude of the torque of the rotary machine to be equal to or greater than an upper limit of an estimated torque range of the engine, and then decreasing the magnitude of the torque of the rotary machine is performed at a time the engagement device is disengaged from the second mode.

6 Claims, 5 Drawing Sheets

(51) Int. Cl.
*B60W 10/08* (2006.01)
*F16D 48/06* (2006.01)
*B60K 6/445* (2007.10)
*B60W 10/02* (2006.01)
*B60K 6/38* (2007.10)

(52) U.S. Cl.
CPC ............. *B60W 20/00* (2013.01); *F16D 48/06* (2013.01); *B60K 2006/381* (2013.01); *B60W 2510/0657* (2013.01); *B60W 2710/021* (2013.01); *B60W 2710/027* (2013.01); *B60W 2710/083* (2013.01); *F16D 2500/1066* (2013.01); *F16D 2500/50858* (2013.01); *Y02T 10/6239* (2013.01); *Y10S 903/93* (2013.01)

(58) Field of Classification Search
USPC .................................................. 701/22, 34.2
See application file for complete search history.

(56) References Cited

U.S. PATENT DOCUMENTS

| | | | | |
|---|---|---|---|---|
| 7,178,619 | B2* | 2/2007 | Oono | B60K 6/445 180/65.285 |
| 8,594,875 | B2* | 11/2013 | Abe | B60K 6/26 180/65.285 |
| 2007/0186703 | A1 | 8/2007 | Sakamoto et al. | |
| 2008/0220933 | A1* | 9/2008 | Maeda | B60K 6/26 477/3 |
| 2010/0324762 | A1* | 12/2010 | Imaseki | B60K 6/36 701/22 |
| 2011/0320075 | A1* | 12/2011 | Kim | B60K 6/445 701/22 |
| 2012/0116629 | A1* | 5/2012 | Kamoshida | B60K 6/36 701/22 |
| 2012/0203417 | A1* | 8/2012 | Matsui | B60K 6/48 701/22 |
| 2012/0209461 | A1* | 8/2012 | Kaminsky | B60K 6/445 701/22 |
| 2013/0079192 | A1* | 3/2013 | Terakawa | B60W 10/02 477/5 |
| 2013/0231816 | A1* | 9/2013 | Hirata | B60L 15/2054 701/22 |
| 2013/0274969 | A1* | 10/2013 | Wang | B60W 10/08 701/22 |
| 2014/0180521 | A1* | 6/2014 | Tsuchikawa | B60K 6/48 701/22 |
| 2014/0303822 | A1* | 10/2014 | Kawamura | B60K 6/48 701/22 |
| 2014/0303823 | A1* | 10/2014 | Nakanishi | B60K 6/48 701/22 |
| 2014/0303825 | A1* | 10/2014 | Tsuda | B60W 10/115 701/22 |
| 2015/0051766 | A1* | 2/2015 | Matsui | B60K 6/48 701/22 |

FOREIGN PATENT DOCUMENTS

| | | | | |
|---|---|---|---|---|
| JP | 2005-114107 A | 4/2005 | | |
| JP | 2006-083919 A | 3/2006 | | |
| JP | 2009-286356 A | 12/2009 | | |
| JP | 2011-051553 A | 3/2011 | | |
| JP | 2012-193851 A | 10/2012 | | |
| JP | 2013-035441 A | 2/2013 | | |
| JP | 5862804 B2 | 2/2016 | | |
| WO | WO2013021765 A1 * | 3/2013 | ............ | B60W 10/02 |
| WO | WO2013111866 A1 * | 8/2013 | ............ | B60W 10/02 |
| WO | WO 2014/109036 A1 | 7/2014 | | |

* cited by examiner

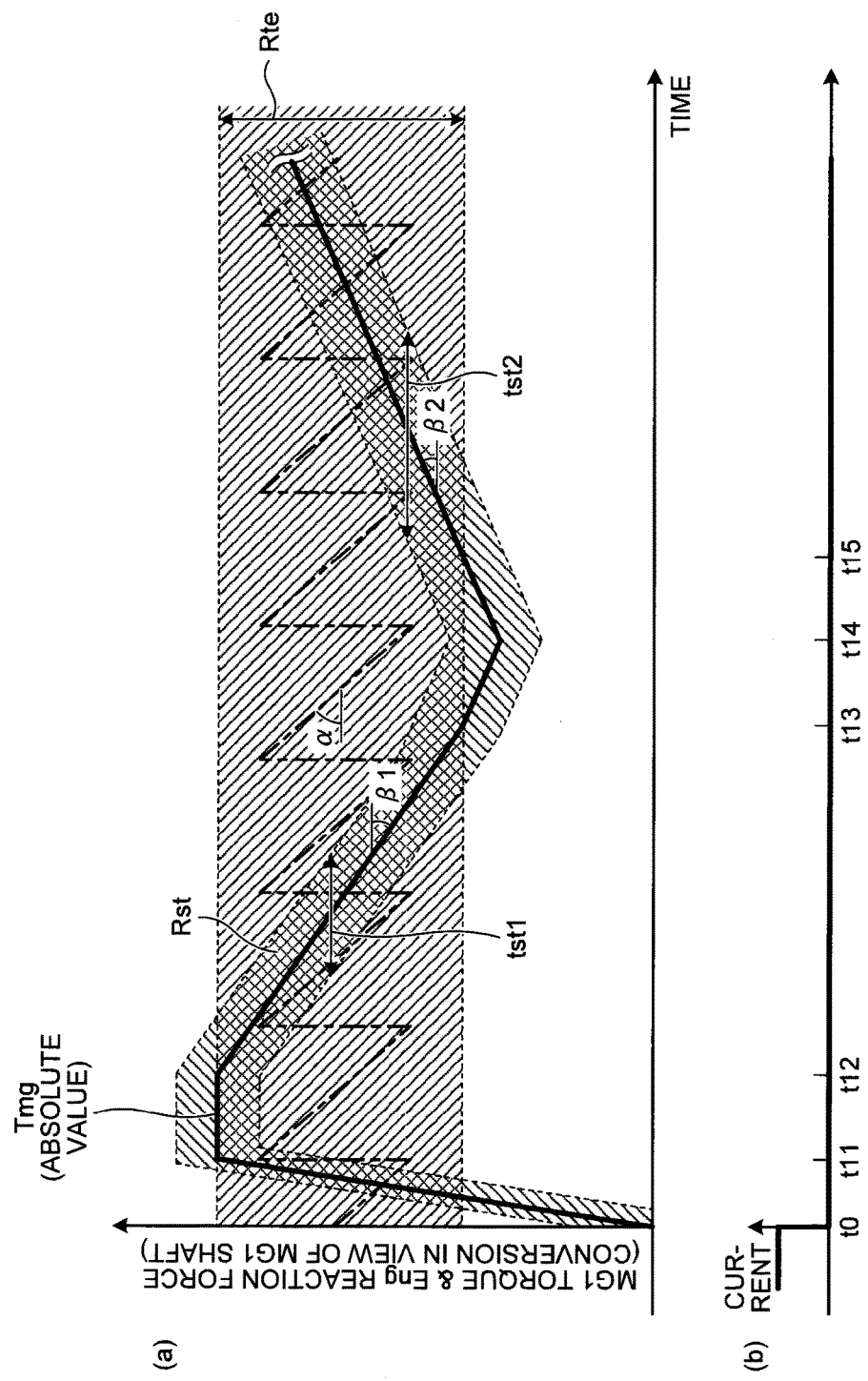

HYBRID VEHICLE DRIVE SYSTEM

FIELD

The present invention relates to a hybrid vehicle drive system.

BACKGROUND

In the related art, techniques of disengaging a gear type engagement device have been known. For example, Patent Literature 1 discloses a technique of a gear type engagement device that performs a swing control of calculating a pre-disengagement request torque required for a first MG, in which power is transmitted to a hub, to switch a dog clutch to a disengaged state and increasing and decreasing a torque of the first MG such that the hub swings when the dog clutch is switched from an engaged state to the disengaged state in the dog clutch in which engagement and disengagement of the hub and a brake member are carried out by an actuator.

CITATION LIST

Patent Literature

Patent Literature 1: Japanese Laid-open Patent Publication No. 2012-193851

SUMMARY

Technical Problem

The torque control in disengaging the gear type engagement device has room for improvement. For example, there is a possibility that responsiveness in disengaging the engagement device will decrease due to an influence of torque fluctuation based on explosion fluctuation of an engine.

An object of the present invention is to provide a hybrid vehicle drive system that can improve responsiveness in disengaging a gear type engagement device.

Solution to Problem

A hybrid vehicle drive system according to the present invention includes: an engine; a rotary machine; a gear type engagement device configured to regulate rotation of the rotary machine; a first mode in which a reaction force of the engine is received by a torque of the rotary machine and a vehicle travels using the engine as a power source; and a second mode in which the reaction force of the engine is received by the engagement device and the vehicle travels using the engine as a power source, wherein a first control of receiving the reaction force of the engine by the torque of the rotary machine, increasing a magnitude of the torque of the rotary machine to be equal to or greater than an upper limit of an estimated torque range of the engine, and then decreasing the magnitude of the torque of the rotary machine is performed at a time the engagement device is disengaged from the second mode, and wherein a magnitude of a slope of the torque of the rotary machine at a time the magnitude of the torque of the rotary machine is decreased in the first control is equal to or less than a magnitude of a slope of a torque of the engine when the torque of the engine decreases due to explosion fluctuation of the engine.

In the hybrid vehicle drive system, it is preferable that a stroke time of the engagement device is equal to or greater than one cycle of the explosion fluctuation of the engine, the stroke time of the engagement device being determined based on the slope of the torque of the rotary machine at the time the magnitude of the torque of the rotary machine is decreased in the first control and a disengagement thrust of the engagement device.

In the hybrid vehicle drive system, it is preferable that a second control of increasing the magnitude of the torque of the rotary machine so as to pass through the estimated torque range of the engine is performed at a time the magnitude of the torque of the rotary machine is decreased to be less than a lower limit of the estimated torque range of the engine but the engagement device is not disengaged, and that the magnitude of a slope of the torque of the rotary machine at a time the magnitude of the torque of the rotary machine is increased in the second control is less than the magnitude of the slope of the torque of the rotary machine at the time the magnitude of the torque of the rotary machine is decreased in the first control.

Advantageous Effects of Invention

In the hybrid vehicle drive system according to the present invention, the first control of receiving the reaction force of the engine by the torque of the rotary machine, increasing the magnitude of the torque of the rotary machine to be equal to or greater than an upper limit of the estimated torque range of the engine, and then decreasing the magnitude of the torque of the rotary machine is performed when the engagement device is disengaged from the second mode, and the magnitude of a slope of the torque of the rotary machine when the magnitude of the torque of the rotary machine is decreased in the first control is equal to or less than the magnitude of a slope of a torque of the engine when the torque of the engine decreases due to explosion fluctuation of the engine. The hybrid vehicle drive system according to the present invention exhibits an advantageous effect capable of improving responsiveness in disengaging an engagement device.

BRIEF DESCRIPTION OF DRAWINGS

FIG. 6 is a timing chart illustrating a first control and a second control according to the embodiment.

DESCRIPTION OF EMBODIMENTS

Hereinafter, a hybrid vehicle drive system according to an embodiment of the present invention will be described in detail with reference to the accompanying drawings. The present invention is not limited to the embodiment. Elements in the following embodiment include elements which can be thought out by those skilled in the art or substantially identical elements.

Embodiment

Figure 1:
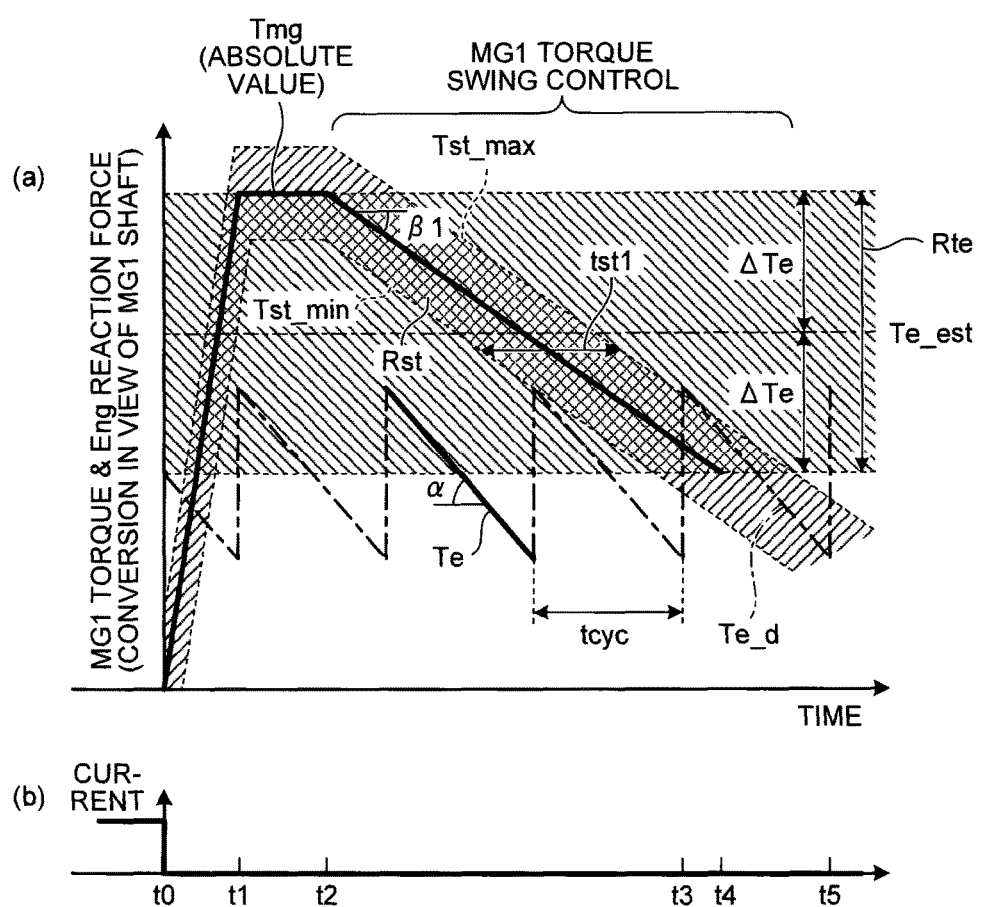
FIG. 1 is a timing chart illustrating a first control according to an embodiment.
Figure 2:
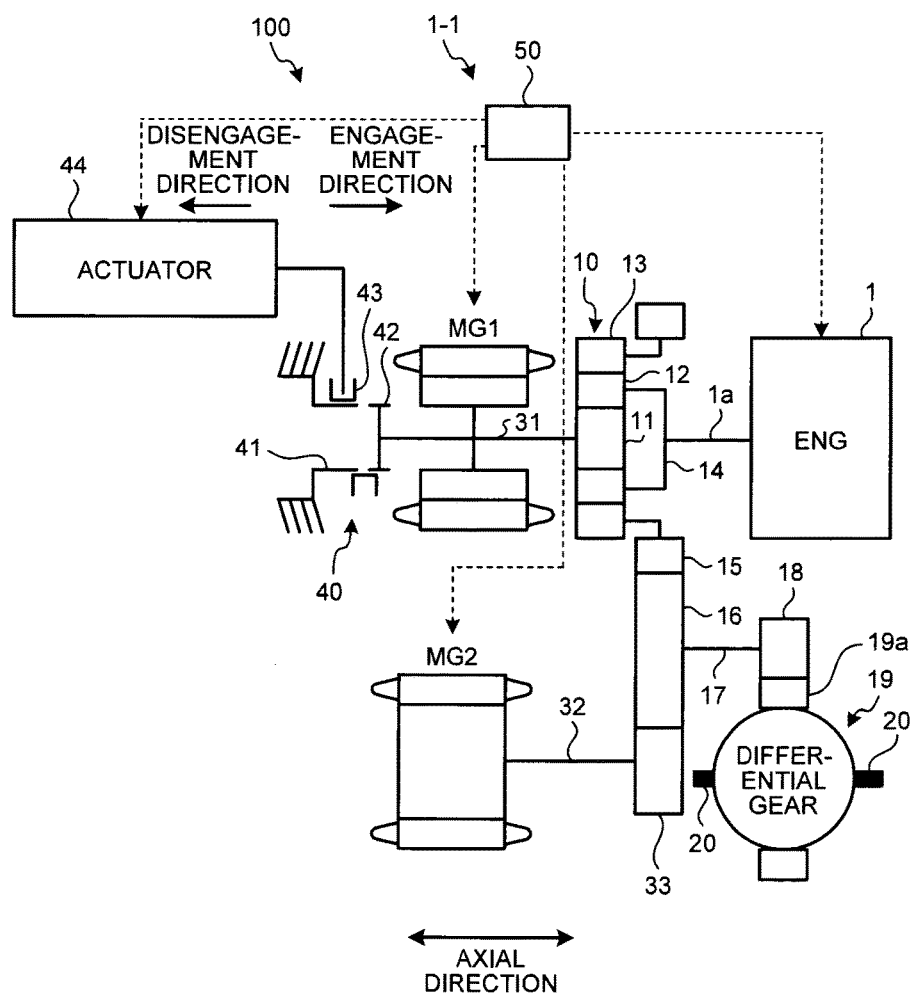
FIG. 2 is a skeleton diagram of a vehicle according to the embodiment.
Figure 3:
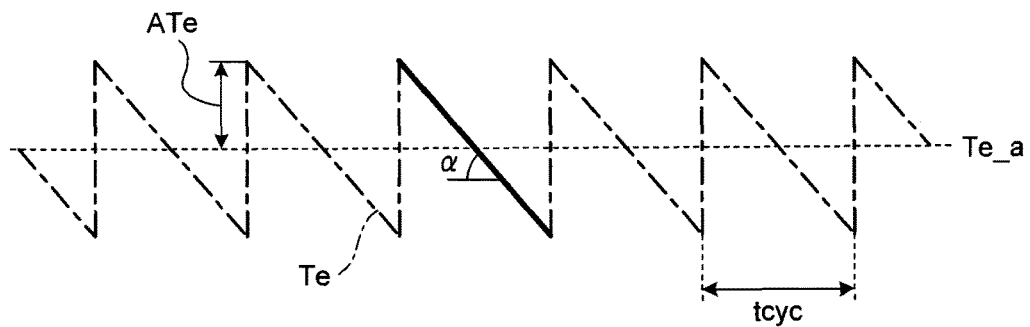
FIG. 3 is a diagram illustrating an example of an engine torque.
Figure 4:
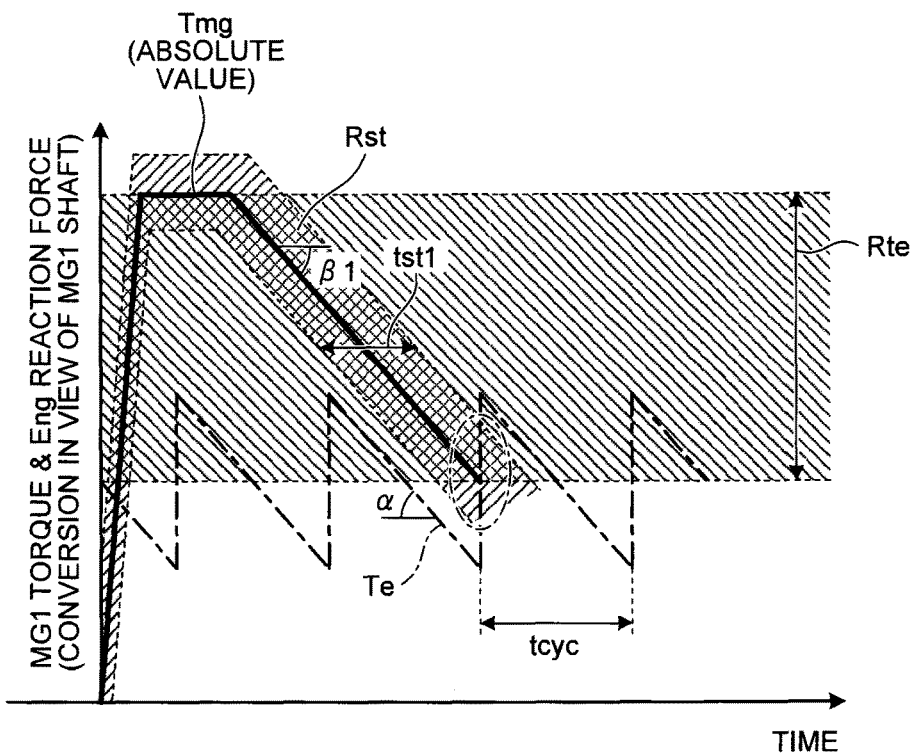
FIG. 4 is a diagram illustrating a problem when a stroke time is short.
Figure 5:
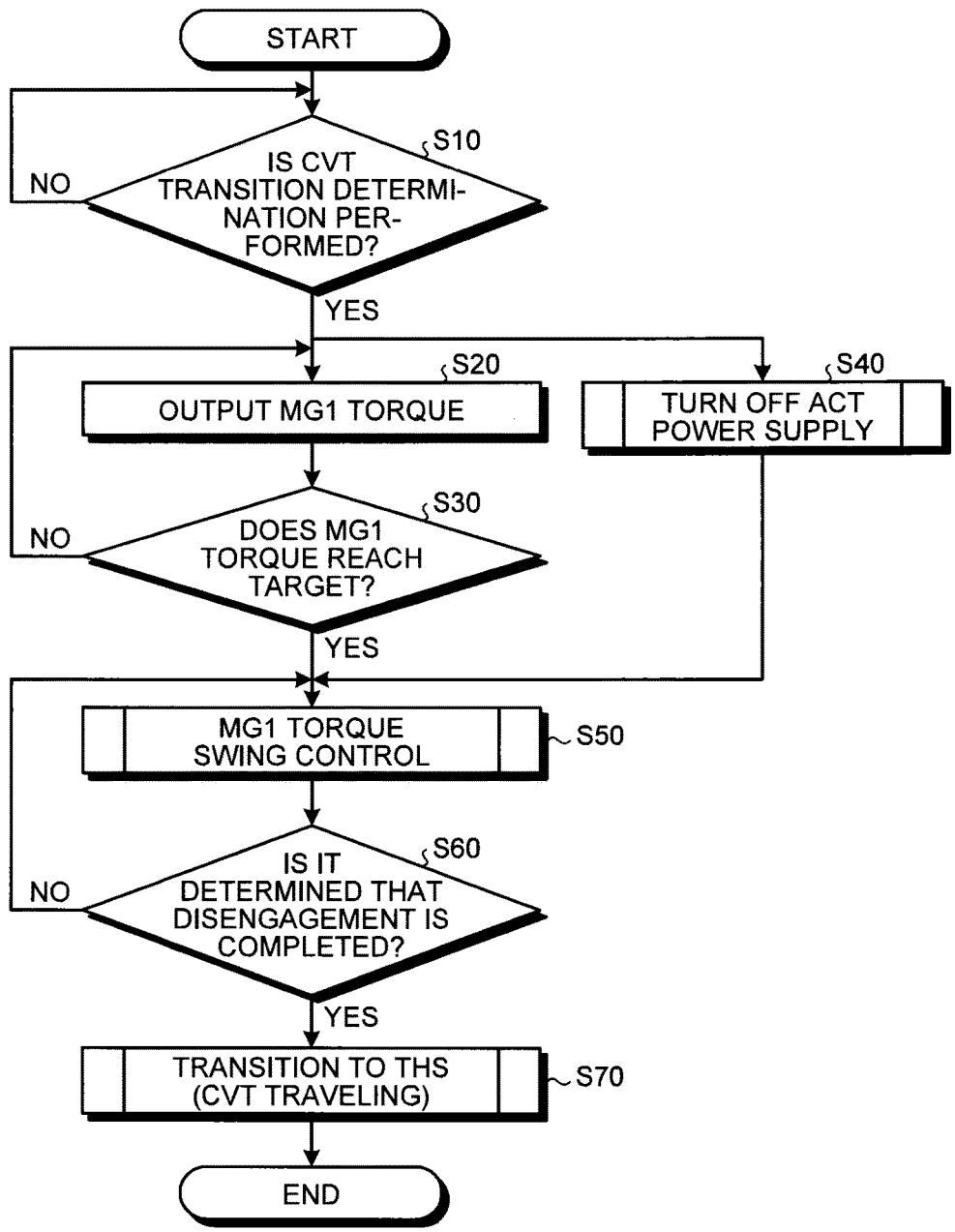
FIG. 5 is a flowchart illustrating a control process flow according to the embodiment.

An embodiment will be described below with reference to FIGS. 1 to 6. This embodiment relates to a hybrid vehicle drive system. FIG. 1 is a timing chart illustrating a first control according to the embodiment of the present invention. FIG. 2 is a skeleton diagram of a vehicle according to this embodiment. FIG. 3 is a diagram illustrating an example of an engine torque. FIG. 4 is an explanatory diagram illustrating a problem when a stroke time is short. FIG. 5 is a flowchart illustrating a control process flow according to this embodiment. FIG. 6 is a timing chart illustrating a first control and a second control according to this embodiment.

As illustrated in FIG. 2, a vehicle 100 is a hybrid vehicle including an engine 1, a first rotary machine MG1, and a second rotary machine MG2. The vehicle 100 may be a plug-in hybrid vehicle (PHV) which can be charged with an external power supply. A hybrid vehicle drive system 1-1 according to this embodiment includes an engine 1, a first rotary machine MG1, and an engagement device 40. The hybrid vehicle drive system 1-1 may further include an ECU 50.

The engine 1 converts combustion energy of fuel into a rotational motion of an output shaft 1a. The output shaft 1a is connected to a carrier 14 of a planetary gear mechanism 10. The planetary gear mechanism 10 has a function of a power distribution mechanism that distributes power of the engine 1 to the first rotary machine MG1 side and the output side. The planetary gear mechanism 10 in this embodiment is a single pinion type and includes a sun gear 11, a pinion gear 12, a ring gear 13, and a carrier 14.

The ring gear 13 is disposed outside in the radial direction of the sun gear 11 so as to be coaxial with the sun gear 11. The pinion gear 12 is disposed between the sun gear 11 and the ring gear 13 and engages the sun gear 11 and the ring gear 13. The pinion gear 12 is rotatably supported by the carrier 14. The carrier 14 is connected to the output shaft 1a and rotates along with the output shaft 1a. Accordingly, the pinion gear 12 can rotate (revolve) around a central axis of the output shaft 1a along with the output shaft 1a and is supported by the carrier 14 so as to rotate (spin) on a central axis of the pinion gear 12.

A rotation shaft 31 of the first rotary machine MG1 is connected to the sun gear 11. The rotation shaft 31 is disposed on the opposite side of the sun gear 11 to the engine 1 side so as to be coaxial with the output shaft 1a. The rotation shaft 31 is connected to a rotor of the first rotary machine MG1 and transmits an output torque of the first rotary machine MG1 (hereinafter, simply referred to as "MG1 torque") to the sun gear 11. The rotation shaft 31 transmits a torque input from the sun gear 11 to the rotor of the first rotary machine MG1.

The engagement device 40 is disposed at the opposite end of the rotation shaft 31 to the sun gear 11 side. The engagement device 40 has a function of a regulator for regulating the rotation of the rotation shaft 31. The engagement device 40 is a gear type clutch unit and includes a vehicle-body-side cylindrical member 41, a piece 42, a sleeve 43, and an actuator 44.

The vehicle-body-side cylindrical member 41 is a cylindrical member and is fixed to the vehicle body so as not to be rotatable. In this embodiment, the engagement device 40 is covered with a cover not illustrated. The vehicle-body-side cylindrical member 41 is fixed to the cover. The cover has functions of a sound insulation cover and a heat insulation cover. The cover can cut off operating noise of a motor of the actuator 44 to prevent the operating noise from entering the vehicle interior. Since a fall in temperature of working oil in the actuator 44 is suppressed by the cover, the actuator 44 smoothly operates at the time of starting at a low temperature.

The piece 42 is connected to the opposite end of the rotation shaft 31 to the sun gear 11 side. The sleeve 43 is supported by the vehicle-body-side cylindrical member 41 so as to be movable in the axial direction. The vehicle-body-side cylindrical member 41 and the sleeve 43 are spline-fitted to each other, are relatively movable in the axial direction, and are not relatively rotatable in the circumferential direction. External teeth extending in the axial direction are formed on the outer circumferential surface of the vehicle-body-side cylindrical member 41. Internal teeth extending in the axial direction are formed on the inner circumferential surface of the sleeve 43. The external teeth of the vehicle-body-side cylindrical member 41 and the internal teeth of the sleeve 43 engage with each other. The sleeve 43 is disposed on the opposite side of the piece 42 to the engine 1 side and faces the engine 1 with the piece 42 interposed therebetween in the axial direction. The sleeve 43 may be disposed on the engine 1 side of the piece 42.

The actuator 44 is a drive unit that applies a driving force in an engagement direction to the sleeve 43. The engagement direction is a direction directed from the vehicle-body-side cylindrical member 41 to the piece 42. The sleeve 43 and the piece 42 have engagement teeth. The engagement device 40 is changed to an engaged state by causing the engagement teeth of the sleeve 43 and the engagement teeth of the piece 42 to engage with each other. The engagement device 40 in the engaged state connects the vehicle-body-side cylindrical member 41 and the piece 42 so as not to be relatively rotatable. That is, the engagement device 40 in the engaged state regulates the rotation of the rotation shaft 31 and regulates the rotation of the first rotary machine MG1.

A biasing force in a disengagement direction, that is, in the opposite direction to the engagement direction, is applied to the sleeve 43 by a biasing member such as a return spring not illustrated. The actuator 44 moves the sleeve 43 in the engagement direction against the biasing force of the biasing member using a generated driving force to cause the sleeve 43 to engage with the piece 42. The actuator 44 applies a driving force in the engagement direction to the sleeve 43, for example, using an electromagnetic force generated by supplied power. The actuator 44 in this embodiment can control a pressing load of the sleeve 43. It is preferable that the actuator 44 does not include a reduction unit such as a solenoid and have a small equivalent mass.

When the supply of power to the actuator 44 is stopped, the sleeve 43 is driven in the disengagement direction using the biasing force of the biasing member. Accordingly, the sleeve 43 moves in the disengagement direction, the sleeve 43 and the piece 42 are disengaged from each other, and the engagement device 40 is changed to a disengaged state.

A counter drive gear 15 is connected to the ring gear 13 of the planetary gear mechanism 10. The counter drive gear 15 engages with a counter driven gear 16. The counter driven gear 16 is connected to a drive pinion gear 18 via a counter shaft 17. The drive pinion gear 18 engages a differential ring gear 19a of a differential gear unit 19. The differential gear unit 19 is connected to right and left driving wheels not illustrated via right and left drive shafts 20.

A reduction gear 33 engages with the counter driven gear 16. The reduction gear 33 is connected to a rotation shaft 32 of the second rotary machine MG2 and rotates along with a rotor of the second rotary machine MG2. The output torque of the second rotary machine MG2 is transmitted from the reduction gear 33 to the counter driven gear 16. That is, the torque transmitted from the engine 1 side via the counter drive gear 15 and the torque transmitted from the second rotary machine MG2 via the reduction gear 33 are combined in the counter driven gear 16 and are output from the drive pinion gear 18. The reduction gear 33 has a diameter smaller than that of the counter driven gear 16 and serves to reduce the rotational force of the second rotary machine MG2 and to output the resultant rotational force to the counter driven gear 16.

The first rotary machine MG1 and the second rotary machine MG2 have a function of a motor (electric motor) and a function of a power generator. The first rotary machine MG1 and the second rotary machine MG2 are connected to a battery via an inverter. The first rotary machine MG1 and the second rotary machine MG2 can convert electric power supplied from the battery into mechanical power and output the mechanical power and can be driven with an input power to convert mechanical power into electric power. The electric power generated by the rotary machines MG1 and MG2 can be stored in the battery. For example, an AC synchronization type motor generator can be used as the first rotary machine MG1 and the second rotary machine MG2.

The ECU 50 is an electronic control unit having a computer. The ECU 50 is electrically connected to the engine 1, the first rotary machine MG1, the second rotary machine MG2, and the actuator 44 of the engagement device 40 and can control the engine 1, the first rotary machine MG1, the second rotary machine MG2, and the actuator 44. A stroke sensor configured to detect a stroke S of the sleeve 43 is connected to the ECU 50. A signal indicating the detection result of the stroke sensor is input to the ECU 50. A signal indicating a detection result of an MG1 rotation speed sensor configured to detect the rotation speed of the first rotary machine MG1 (hereinafter, referred to as "MG1 rotation speed") and a signal indicating a detection result of an MG2 rotation speed sensor configured to detect the rotation speed of the second rotary machine MG2 (hereinafter, referred to as "MG2 rotation speed") are input to the ECU 50. For example, a resolver can be used as the MG1 rotation speed sensor and the MG2 rotation speed sensor.

The vehicle 100 can selectively perform hybrid (HV) traveling and EV traveling. The HV traveling is a traveling mode in which the vehicle 100 travels using the engine 1 as a power source. In the HV traveling, the second rotary machine MG2 in addition to the engine 1 may be used as the power source. The EV traveling is a traveling mode in which the vehicle travels using the second rotary machine MG2 as a power source. In the EV traveling, the vehicle can travel with the engine 1 stopped.

The hybrid vehicle drive system 1-1 according to this embodiment has, as a HV traveling mode, a first mode in which the reaction force of the engine 1 is received by the torque of the first rotary machine MG1 and the vehicle travels using the engine 1 as a power source and a second mode in which the reaction force of the engine 1 is received by the engagement device 40 and the vehicle travels using the engine 1 as a power source.

(First Mode)

The first mode is performed with the engagement device 40 in the disengaged state. When the engagement device 40 is disengaged, the rotations of the rotation shaft 31 and the sun gear 11 are allowed. The first rotary machine MG1 serves as a reaction force receiver outputting a reaction torque of an engine torque and outputs the engine torque from the ring gear 13. In the first mode, the rotation speed of the sun gear 11 can be controlled into an arbitrary rotation speed with respect to the rotation speed of the ring gear 13. That is, the first mode is a CVT mode in which a gear transmission ratio of the rotation speed of the carrier 14 which is an input rotation speed from the engine 1 and the rotation speed of the ring gear 13 which is an output rotation speed therefrom can be continuously controlled.

(Second Mode)

The second mode is performed with the engagement device 40 in the engaged state. When the engagement device 40 is in the engaged state, the rotations of the rotation shaft 31 and the sun gear 11 are regulated. The engagement device 40 serves as a reaction force receiver receiving the reaction torque of the engine torque and outputs the engine torque from the ring gear 13. In the second mode, the rotation speed of the sun gear 11 is fixed to 0 and the first rotary machine MG1 is stopped. The second mode is selected, for example, at a high vehicle speed, in a low load, and when power circulation occurs in the first mode. The second mode is a traveling mode in which an efficiency decrease due to a drag loss of the first rotary machine MG1 or an efficiency decrease due to an electrical path can be suppressed.

When the second mode transitions to the first mode, the engagement device 40 in the engaged state is disengaged. Here, in the second mode, the engine torque is input to the engagement device 40. Accordingly, even when the supply of power to the actuator 44 is stopped to turn off the actuator 44, there is a possibility that the engagement device 40 will not be disengaged or much time will be required until the disengagement. It can be considered that the disengagement thrust of the engagement device 40 is enhanced by increasing the biasing force of the biasing member. However, in this case, it is necessary to increase the driving force of the actuator 44 in changing the engagement device 40 to the engaged state, which causes an increase in power consumption.

The hybrid vehicle drive system 1-1 according to this embodiment performs a disengagement control of promoting the disengagement of the engagement device 40 by outputting the MG1 torque to the first rotary machine MG1 when the engagement device 40 is disengaged from the second mode. The disengagement control will be described below with reference to FIGS. 1 and 6. The disengagement control is a control of changing the magnitude of the MG1 torque in a torque range overlapping an actual engine torque range Rte illustrated in FIGS. 1 and 6. In this embodiment, the ECU 50 changes the magnitude of the MG1 torque in the torque range including the entire actual engine torque range Rte.

In the disengagement control, the relative torque of the sleeve 43 and the piece 42 is decreased by the MG1 torque. In the disengagement control, the relative torque of the sleeve 43 and the piece 42 is changed by adjusting the MG1 torque. The relative movement in the axial direction of the sleeve 43 and the piece 42 is facilitated by the disengagement control and thus the stroke in the disengagement direction of the sleeve 43 is promoted. Accordingly, it is possible to shorten the time required for disengagement of the engagement device 40 and thus to enhance responsiveness in disengaging the engagement device 40. As a result, for example, it is possible to enhance responsiveness of mode change from the second mode to the first mode. In addition, it is possible to reduce the driving force of the actuator 44 by decreasing the biasing force (disengagement thrust) required for the biasing member, thereby suppressing the power consumption of the actuator 44.

The hybrid vehicle drive system 1-1 can perform a first control and a second control as the disengagement control. When the engagement device 40 is disengaged, the first control is first performed. When the engagement device 40 is not disengaged even by performing the first control, the second control is performed. The first control will be described below with reference to FIG. 1.

(First Control)

The first control is a control of receiving the reaction force of the engine 1 by the torque of the first rotary machine MG1, increasing the magnitude of the torque of the first rotary machine MG1 to the upper limit of the estimated engine torque range, and then decreasing the magnitude of the torque of the first rotary machine MG1. FIG. 1(a) illustrates the torque which is converted into a value on the rotation shaft 31 and FIG. 1(b) illustrates a current value which is supplied to the actuator 44. As the engine torque Te, the torque which is converted into a value on the rotation shaft 31 based on the gear ratio of the planetary gear mechanism 10 is illustrated. The absolute value is illustrated as the MG1 torque Tmg. When the rotation direction of the engine 1 is defined to be positive, the engine torque Te is a positive torque and the MG1 torque in the first control is a negative torque receiving the reaction force of the engine 1. Accordingly, a command value of the MG1 torque in the first control is a torque having the same magnitude as the MG1 torque Tmg illustrated in FIGS. 1 and 6, and having the opposite sign.

In FIG. 1, the actual engine torque range Rte is an estimated engine torque range and is an engine torque range based on an operating condition. The actual engine torque range Rte in this embodiment is defined as a range in which the average value of the engine torque Te is present. As illustrated in FIG. 3, the engine torque Te periodically varies due to explosion fluctuation. The value denoted by reference sign Te_a is the average value or the effective value of the engine torque Te and is a value from which the variation component due to the explosion fluctuation is excluded. The actual engine torque range Rte illustrated in FIG. 1 is a range in which the average value Te_a of the engine torque Te is estimated to be present. For example, the actual engine torque range Rte is a torque range having a value, which is obtained by adding a predetermined torque ΔTe to an estimated engine torque Te_est determined from the operating condition, as an upper limit and having a value, which is obtained by subtracting the predetermined torque ΔTe therefrom, as a lower limit. The ECU 50 stores, for example, the actual engine torque range Rte based on the operating condition in advance. The estimated engine torque Te_est or the predetermined torque ΔTe can be determined by pre-evaluation, simulation, or the like.

In the first control, the ECU 50 first increases the magnitude of the MG1 torque Tmg to the upper limit or greater of the actual engine torque range Rte. In FIG. 1, the output of the MG1 torque is started at time t0, the magnitude of the MG1 torque Tmg is increased to the upper limit of the actual engine torque range Rte at time t1. Then, the ECU 50 decreases the magnitude of the MG1 torque Tmg. In FIG. 1, the decrease of the MG1 torque is started at time t2.

The ECU 50 decreases the magnitude of the MG1 until the magnitude of the MG1 torque Tmg reaches the lower limit of the actual engine torque range Rte. The ECU 50 ends the first control when the magnitude of the MG1 torque Tmg is decreased to the lower limit of the actual engine torque range Rte.

A stroke possible region Rst is a torque region in which the sleeve 43 can be stroked in the disengagement direction by the biasing force of the biasing member. When the engine torque Te is a value in the stroke possible region Rst, the magnitude of the relative torque of the sleeve 43 and the piece 42 in the engagement device 40 is small and the sleeve 43 can be moved in the disengagement direction by the biasing force of the biasing member. On the other hand, when the engine torque Te is not a value in the stroke possible region Rst, the relative torque of the sleeve 43 and the piece 42 is large and the biasing force of the biasing member is not sufficient for moving the sleeve 43 in the disengagement direction.

In the first control, when the engine torque Te becomes a value in the stroke possible region Rst while the magnitude of the MG1 torque is decreasing, the sleeve 43 moves in the disengagement direction by the biasing force of the biasing member and the engagement device 40 is disengaged. In FIG. 1, between time t3 and time t4, the engine torque Te is in the stroke possible region Rst and the disengagement of the engagement device 40 is promoted. The ECU 50 can determine whether the sleeve 43 is located at a disengagement position based on the detection result of the stroke sensor. When it is determined that the sleeve 43 is located at the disengagement position, the first control is ended. For example, when the engagement device 40 is disengaged before the magnitude of the MG1 torque Tmg is decreased to the lower limit of the actual engine torque range Rte, the first control is ended at that time and the disengagement control for disengagement of the engagement device 40 is ended. The ECU 50 can also determine whether the sleeve 43 is located at the disengagement position based on the detection result of the MG1 rotation speed sensor instead of or in addition to the detection result of the stroke sensor. The ECU 50 can determine whether the engagement device 40 is disengaged, for example, based on the rotational angle position or the rotation speed of the first rotary machine MG1 detected by the MG1 rotation speed sensor.

In this embodiment, the magnitude of a slope β1 of the MG1 torque Tmg when the magnitude of the MG1 torque Tmg is decreased in the first control is equal to or less than the magnitude of a slope α of the engine torque Te when the engine torque Te is decreased due to the explosion fluctuation of the engine 1. That is, the magnitude of the MG1 torque Tmg decreases more slowly than the engine torque Te. Accordingly, the engine torque Te can easily enter the stroke possible region Rst.

Here, the slope α of the engine torque Te varies depending on the operating condition of the engine 1. In this embodiment, the slope β1 of the MG1 torque Tmg is determined based on the slope α of the engine torque Te in the operating condition of the engine 1 in which the engagement device 40 is not easily disengaged. The engagement device 40 is not easily disengaged when the engine torque Te varies in a saw-tooth shape as illustrated in FIG. 3. The waveform of the engine torque Te approaches the saw-tooth shape when the engine rotation speed is low. In this embodiment, the slope α of the engine torque Te is calculated from the slope of the engine torque Te at the engine rotation speed at which the amplitude ΔTe of the waveform of the engine torque Te is a maximum and one cycle of the explosion fluctuation (hereinafter, also referred to as "explosion cycle") tcyc of the engine 1 is a maximum.

The engine rotation speed at which the amplitude ATe of the waveform of the engine torque Te is a maximum and the explosion cycle tcyc is a maximum is, for example, 1,000 rpm. When the engine rotation speed is 1,000 rpm and the amplitude ATe of the engine torque Te is 10 Nm (which is a converted value on the rotation shaft 31), the slope of the engine torque Te can be calculated as follows.

The explosion cycle tcyc is determined from the number of cylinders of the engine 1 and the engine rotation speed. For example, the number of times of explosion per rotation in the four-cylinder engine 1 is two. Accordingly, the explosion cycle when the engine rotation speed is 1,000 rpm is 0.03 [sec] from Equation (1).

$$1/(2\times 1,000/60)=0.03 \tag{1}$$

The slope α of the engine torque Te is 666.67 [Nm/sec] from Equation (2).

$$2\times 10/0.03=666.67 \tag{2}$$

In this embodiment, based on the slope α of the engine torque Te calculated from the operating condition of the engine 1 in which the engagement device 40 is not easily disengaged, the magnitude of the slope β1 of the MG1 torque Tmg is set to be equal to or less than the slope α of the engine torque Te. Accordingly, as will be described below, it is possible to promote the disengagement of the engagement device 40 regardless of the traveling condition.

When the magnitude of the slope β1 is greater than the slope α of the engine torque Te, there is a high possibility that only a little time to stroke the sleeve 43 will remain as described with reference to FIG. 4. When the magnitude of the slope β1 of the MG1 torque Tmg is greater than the magnitude of the slope α of the engine torque Te, the time in which the stroke possible region Rst and the engine torque Te cross each other tends to be easily shortened. For example, as illustrated in FIG. 4, there is a possibility that a period of time in which the engine torque Te is a value in the stroke possible region Rst is only a short period of time in the course of increasing the engine torque Te. As a result, the first control may be ended in a state in which the sleeve 43 hardly strokes in the disengagement direction and the engagement device 40 is not disengaged.

In this embodiment, the magnitude of the slope β1 of the MG1 torque Tmg in the first control is equal to or less than the slope α of the engine torque Te. Accordingly, as illustrated in FIG. 1, the engine torque Te (Te_d) when the engine torque Te decreases and the stroke possible region Rst easily cross each other. The engine torque Te and the stroke possible region Rst easily cross each other over plural cycles of the explosion fluctuation of the engine 1.

In the hybrid vehicle drive system 1-1 according to this embodiment, the stroke time tst1 is equal to or greater than the explosion cycle tcyc. Accordingly, it is advantageous in securing the time to cause the sleeve 43 to stroke in the disengagement direction.

The stroke time tst1 is a period of time which is determined from the slope β1 of the MG1 torque Tmg when the magnitude of the MG1 torque is decreased in the first control and the disengagement thrust of the engagement device 40. The disengagement thrust is a thrust for driving the sleeve 43 in the disengagement direction by the biasing force of the biasing member. The width in the vertical axis direction of the stroke possible region Rst is determined based on the disengagement thrust. That is, an upper-limit torque Tst_max of the stroke possible region Rst and a lower-limit torque Tst_min of the stroke possible region Rst are determined based on the disengagement thrust.

The stroke time tst1 is the width in the horizontal axis direction of the stroke possible region Rst when the magnitude of the MG1 torque is decreased in the first control. That is, the stroke time tst1 is a period of time in which the sleeve 43 can be made to stroke maximally when the engine torque Te is constant. In this embodiment, the stroke time tst1 is equal to or greater than the explosion cycle tcyc. The biasing force of the biasing member is determined such that the stroke time tst1 is equal to or greater than the explosion cycle tcyc, for example, when the magnitude of the slope β1 of the MG1 torque when the magnitude of the MG1 torque is decreased in the first control is equal to the magnitude of the slope α of the engine torque Te. Since the stroke time tst1 is equal to or greater than the explosion cycle tcyc, the engine torque Te and the stroke possible region Rst can easily cross each other while the magnitude of the MG1 torque is being decreased in the first control and it is thus possible to extend the period of time in which the sleeve 43 strokes.

Operations in this embodiment will be described below with reference to FIG. 5. The control process flow illustrated in FIG. 5 is repeatedly performed, for example, with a predetermined cycle in traveling.

First, in step S10, the ECU 50 determines whether CVT transition determination is performed. The CVT transition determination is determination on transition from the second mode to the first mode. The control process moves to step S20 when it is determined in step S10 that the CVT transition determination is performed (Y in step S10), and the determination of step S10 is repeated otherwise (N in step S10).

In step S20, the ECU 50 starts the output of the MG1 torque. The ECU 50 outputs a command for increasing the magnitude of the MG1 torque to the upper limit or greater of the actual engine torque range Rte. The first rotary machine MG1 outputs a reaction torque of the engine torque and increases the magnitude of the MG1 torque while receiving the reaction force of the engine 1. When step S20 is performed, the control process goes to step S30.

In step S30, the ECU 50 determines whether the MG1 torque reaches a target. The ECU 50 determines whether the magnitude of the MG1 torque reaches a target value which is equal to or greater than the upper limit of the actual engine torque range Rte. The control process goes to step S50 when it is determined in step S30 that the MG1 torque reaches the target (Y in step S30), and the control process goes to step S20 otherwise (N in step S30). In FIG. 1, the MG1 torque reaches the target at time t1, and the condition in which the determination result of step S30 is positive is established.

The ECU 50 performs step S40 in parallel with steps S20 and S30. In step S40, the ECU 50 stops the supply of a current to the actuator 44. Step S40 is performed until step S50 is started after the determination result of step S10 is positive.

In step S50, the ECU 50 performs an MG1 torque swing control. The MG1 torque swing control is a step of decreasing the magnitude of the MG1 torque in the first control and is a control of decreasing the magnitude of the MG1 torque in the torque range of the actual engine torque range Rte. In FIG. 1, the MG1 torque swing control is started at time t2. When step S50 is performed, the control process goes to step S60.

In step S60, the ECU 50 determines whether the disengagement is completed. In step S60, it is determined whether the disengagement of the engagement device 40 is completed. The ECU 50 can perform the determination of step S60 based on the detection result of the stroke sensor. For example, when the detected stroke of the sleeve 43 is a value in a predetermined stroke range indicating the disengaged state, the ECU 50 performs the positive determination in step S60. The ECU 50 may determine whether the disengagement of the engagement device 40 is completed based on the detection result of the MG1 rotation speed sensor. The control process goes to step S70 when it is determined in step S60 that the disengagement is completed (Y in step S60), and the control process goes to step S50 otherwise (N in step S60).

In step S70, the ECU 50 performs transition to THS (CVT traveling). The ECU 50 transitions to the first mode which is the HV traveling mode, receives the reaction force of the engine 1 by the torque of the first rotary machine MG1, and causes the vehicle 100 to travel using the engine 1 as a power source. When step S70 is performed, the control process flow ends.

Here, a case in which the disengagement of the engagement device 40 is not completed even by performing the first control will be considered. The hybrid vehicle drive system 1-1 according to this embodiment performs the second control when the engagement device 40 is not disengaged even by performing the first control. The second control will be described below with reference to FIG. 6.

(Second Control)

The second control is a control of increasing the magnitude of the torque of the first rotary machine MG1 so as to pass through the actual engine torque range Rte. In FIG. 6, the first control is started at time t0, and the magnitude of the MG1 torque increases to the upper limit of the actual engine torque range Rte at time t11. The ECU 50 starts decreasing of the magnitude of the MG1 torque at time t12. At time t13, the magnitude of the MG1 torque decreases to the lower limit of the actual engine torque range Rte. When the magnitude of the MG1 torque decreases to be less than the lower limit of the actual engine torque range Rte but the disengagement of the engagement device 40 is not completed, the ECU 50 performs the second control.

The ECU 50 starts increasing the magnitude of the MG1 torque at time t14 after time t13. The ECU 50 increases the magnitude of the MG1 torque such that the magnitude of the MG1 torque is within the actual engine torque range Rte. The magnitude of the slope $\beta 2$ of the MG1 torque in increasing the magnitude of the MG1 torque is less than the magnitude of the slope $\beta 1$ of the MG1 torque in decreasing the magnitude of the MG1 torque in the first control. That is, in the second control, the slope of the MG1 torque is gradual than that in the first control. In the second control, the ECU 50 increases the magnitude of the MG1 torque until the magnitude of the MG1 torque Tmg becomes equal to the upper limit of the actual engine torque range Rte.

In FIG. 6, the magnitude of the MG1 torque increases to the lower limit of the actual engine torque range Rte at time t15, and the magnitude of the MG1 torque increases in the actual engine torque range Rte after time t15. Since the slope $\beta 2$ of the MG1 torque in the second control is gradual than the slope $\beta 1$ of the MG1 torque in the first control, the stroke time tst2 of the second control is longer than the stroke time tst1 of the first control. Accordingly, it is possible to secure the period of time in which the sleeve 43 will be stroked in the disengagement direction and thus to disengage the engagement device 40.

In the disengagement control at the time of disengaging the engagement device 40, the magnitude of the MG1 torque may be changed to a torque greater than the upper limit of the actual engine torque range Rte or the magnitude of the MG1 torque may be changed to a torque less than the lower limit of the actual engine torque range Rte.

For example, in the first control illustrated in FIG. 1, the first control is ended when the magnitude of the MG1 torque Tmg decreases to the lower limit of the actual engine torque range Rte at time t4, but the first control may be continuously performed to decrease the magnitude of the MG1 torque Tmg even after time t4 instead. In this case, even when the actual engine torque Te is present on a torque side lower than the lower limit of the actual engine torque range Rte, it is possible to overlap the engine torque Te with the stroke possible region Rst and thus to stroke the sleeve 43 in the disengagement direction. For example, in FIG. 1, the engine torque Te can be overlapped with the stroke possible region Rst up to time t5 at which the engine torque Te increases due to explosion.

The first control may be ended, for example, when the upper-limit torque Tst_max of the stroke possible region Rst becomes equal to the lower limit of the actual engine torque range Rte. When the magnitude of the MG1 torque Tmg is decreased to be less than the lower limit of the actual engine torque range Rte in the first control, the magnitude of the MG1 torque Tmg at the time of starting the second control can be set to a torque less than the lower limit of the actual engine torque range Rte. Accordingly, even when the actual engine torque Te is present on a torque side lower than the lower limit of the actual engine torque range Rte, it is possible to overlap the engine torque Te with the stroke possible region Rst in the second control.

The magnitude of the MG1 torque Tmg at the time of starting the first control may be set to be greater than the upper limit of the actual engine torque range Rte. In this case, even when the actual engine torque Te is present on a torque side higher than the upper limit of the actual engine torque range Rte, it is possible to overlap the engine torque Te with the actual engine torque range Rte. In the second control, the magnitude of the MG1 torque Tmg may be increased to a torque greater than the upper limit of the actual engine torque range Rte.

Modification Example of Embodiment

In the above-mentioned embodiment, the vehicle 100 is equipped with two rotary machines MG1 and MG2, but the present invention is not limited to this configuration. The number of rotary machines with which the vehicle is equipped may be one or three or more. For example, the second rotary machine MG2 may be removed. The connection relationship between rotary elements of the planetary gear mechanism 10 and the engine 1, the first rotary machine MG1, and the driving wheels is not limited to the exemplified relationship. For example, the engine 1 may be connected to a rotary element other than the carrier 14, the first rotary machine MG1 may be connected to a rotary element other than the sun gear 11, and the driving wheels may be connected to a rotary element other than the ring gear 13. The engine 1, the first rotary machine MG1, and the driving wheels only have to be connected to different rotary elements. A differential gear mechanism connecting the engine 1, the first rotary machine MG1, and the driving wheels is not limited to the single pinion type planetary gear mechanism 10.

The engagement device 40 in the above-mentioned embodiment is driven in the disengagement direction by the biasing force of the biasing member, but may be driven in the disengagement direction by the driving force of the actuator 44 instead.

In the above-mentioned embodiment, the slope $\beta 1$ of the MG1 torque Tmg in decreasing the magnitude of the MG1 torque Tmg in the first control is constant, but the slope $\beta 1$ of the MG1 torque Tmg may vary. In the above-mentioned embodiment, the slope $\beta 2$ of the MG1 torque Tmg in increasing the magnitude of the MG1 torque Tmg in the second control is constant, but the slope $\beta 2$ of the MG1 torque Tmg may vary.

The details of the above-mentioned embodiment and modification examples can be appropriately combined into practice.

REFERENCE SIGNS LIST 1-1 HYBRID VEHICLE DRIVE SYSTEM
1 ENGINE
10 PLANETARY GEAR MECHANISM
11 SUN GEAR
12 PINION GEAR
13 RING GEAR
14 CARRIER
31 ROTATION SHAFT
40 ENGAGEMENT DEVICE
41 VEHICLE-BODY-SIDE CYLINDRICAL MEMBER
42 PIECE
43 SLEEVE
44 ACTUATOR (DRIVE DEVICE)
MG1 FIRST ROTARY MACHINE
MG2 SECOND ROTARY MACHINE

The invention claimed is:

1. A hybrid vehicle drive system comprising:
an engine;
a planetary gear mechanism including carrier connected to an output shaft of the engine;
a first rotary machine including a rotation shaft, a first end of the rotation shaft connected to a sun gear of the planetary gear mechanism;
a gear type engagement device configured to regulate rotation of the rotary machine, a second end of the rotation shaft connected to the gear type engagement device; and
a controller configured to control a vehicle to travel in a first mode in which a reaction force of the engine is received by a torque of the rotary machine and the vehicle travels using the engine as a power source; and configured to control the vehicle to travel in a second mode in which the reaction force of the engine is received by the engagement device and the vehicle travels using the engine as a power source,
wherein the controller is configured to perform a first control of receiving the reaction force of the engine by the torque of the rotary machine, increasing a magnitude of the torque of the rotary machine to be equal to or greater than an upper limit of an estimated torque range of the engine, and then decreasing the magnitude of the torque of the rotary machine is performed at a time the engagement device is disengaged in transition from the second mode to the first mode, and
wherein a magnitude of a slope of the torque of the rotary machine at a time the magnitude of the torque of the rotary machine is decreased in the first control is determined based on a slope of a torque of the engine and is equal to or less than a magnitude of the slope of the torque of the engine when the torque of the engine decreases due to explosion fluctuation of the engine.

2. The hybrid vehicle drive system according to claim 1, wherein a stroke time of the engagement device is equal to or greater than one cycle of the explosion fluctuation of the engine, the stroke time of the engagement device being determined based on the slope of the torque of the rotary machine at the time the magnitude of the torque of the rotary machine is decreased in the first control and a disengagement thrust of the engagement device.

3. The hybrid vehicle drive system according to claim 1, wherein the controller is configured to perform a second control of increasing the magnitude of the torque of the rotary machine so as to pass through the estimated torque range of the engine at a time the magnitude of the torque of the rotary machine is decreased to be less than a lower limit of the estimated torque range of the engine but the engagement device is not disengaged, and
wherein the magnitude of a slope of the torque of the rotary machine at a time the magnitude of the torque of the rotary machine is increased in the second control is less than the magnitude of the slope of the torque of the rotary machine at the time the magnitude of the torque of the rotary machine is decreased in the first control.

4. The hybrid vehicle drive system according to claim 2, wherein the controller is configured to perform a second control of increasing the magnitude of the torque of the rotary machine so as to pass through the estimated torque range of the engine at a time the magnitude of the torque of the rotary machine is decreased to be less than a lower limit of the estimated torque range of the engine but the engagement device is not disengaged, and
wherein the magnitude of a slope of the torque of the rotary machine at a time the magnitude of the torque of the rotary machine is increased in the second control is less than the magnitude of the slope of the torque of the rotary machine at the time the magnitude of the torque of the rotary machine is decreased in the first control.

5. The hybrid vehicle drive system according to claim 1, wherein the hybrid vehicle drive system further comprises a second rotary machine connected to a ring gear of the planetary gear mechanism.

6. The hybrid vehicle drive system according to claim 5, wherein in the first mode the second rotary machine is a second power source.

* * * * *